United States Patent [19]

Sowa et al.

[11] Patent Number: 4,907,564
[45] Date of Patent: Mar. 13, 1990

[54] WIRE SAW

[75] Inventors: Nobuhiro Sowa, Kawachinagano; Syuichiro Koroku, both of Fujieda, Japan

[73] Assignees: Sumitomo Rubber Industries, Ltd., Kobe; Osaka Diamond Industrial Co., Sakai, both of Japan

[21] Appl. No.: 274,489

[22] Filed: Nov. 22, 1988

[30] Foreign Application Priority Data

Nov. 24, 1987 [JP] Japan .............................. 62-179269[U]
Apr. 12, 1988 [JP] Japan .............................. 63-48887[U]
Apr. 12, 1988 [JP] Japan .............................. 63-48888[U]

[51] Int. Cl.$^4$ .............................................. B28D 1/08
[52] U.S. Cl. ...................................... 125/21; 156/338; 264/236; 264/347; 403/225; 403/299; 403/334
[58] Field of Search ............................. 125/21, 12, 36; 156/324, 331.1, 338, 901; 204/12, 27, 28; 264/236, 331.13, 347; 403/225, 299, 307, 334; 24/136 B, 136 L; 57/906

[56] References Cited

U.S. PATENT DOCUMENTS

| | | | |
|---|---|---|---|
| 1,570,445 | 1/1926 | Merrill | 156/338 X |
| 1,883,973 | 10/1932 | Kurtz | 156/338 X |
| 1,984,024 | 12/1934 | Little | 403/299 X |
| 2,652,231 | 9/1953 | Smith | 403/299 X |
| 3,429,769 | 2/1969 | Ippen et al. | 156/333 X |
| 3,884,212 | 5/1975 | Armstrong et al. | 125/21 |
| 4,292,111 | 9/1981 | Bezwada | 156/338 X |
| 4,483,815 | 11/1984 | Torghele | 264/347 X |
| 4,671,761 | 6/1987 | Adrian et al. | 264/347 X |
| 4,702,867 | 10/1987 | Sejimo et al. | 264/347 X |
| 4,756,970 | 7/1988 | Brandyberry et al. | 57/906 |

FOREIGN PATENT DOCUMENTS

| | | | |
|---|---|---|---|
| 0160625 | 11/1985 | European Pat. Off. | 125/21 |
| 0026241 | 2/1984 | Japan | 264/331.13 |

OTHER PUBLICATIONS

"Continuous Plating Equipment for Steel Mill Products", by Kenneth Graham.

Primary Examiner—Frederick R. Schmidt
Assistant Examiner—S. Desai
Attorney, Agent, or Firm—Staas & Halsey

[57] ABSTRACT

A plurality of abrasive sleeves (3) surround a wire rope (2) and are spaced at predetermined intervals longitudinally of the wire rope. An elastic material (4) of rubber such as natural rubber is formed between the abrasive sleeves in such a manner as to surround the wire rope. A rubber/metal bonding agent (7) such as chlorinated rubber type bonding agent is used to effect vulcanization bonding between the opposite end surfaces of each abrasive sleeve and the elastic material and between the wire rope and the elastic material. The ends (19) of the wire rope are connected together by a combination of end connecting members (5, 6a) provided with male threads (17, 17a) and fixed to the ends of the wire rope and on internally threaded connecting sleeve (30), whereby a closed loop is formed.

12 Claims, 3 Drawing Sheets

WIRE SAW

BACKGROUND OF THE INVENTION

1. Field of the Invention

This invention relates to a wire saw used for cutting stone, concrete and the like and particularly to a wire saw having a plurality of abrasive sleeves spaced at predetermined intervals along a wire rope.

2. Background Art

A wire saw which is of interest to this invention is disclosed in European Patent Publication No. 0,160,625. The wire saw disclosed therein comprises a wire rope on which a plurality of abrasive sleeves are disposed at predetermined intervals longitudinally of the rope, said abrasive sleeves being fixed in position relative to the wire rope by forming a layer of elastic material, such as thermoplastic rubber, on the wire rope and at least between adjacent sleeves.

A wire saw disclosed in U.S. Pat. No. 3,884,212 has substantially the same construction as described above.

Generally, a wire saw is furnished in the form of a closed loop and is rotated when used for cutting. During cutting, the wire saw is subjected to repetitive bending.

When attention is paid to the above-mentioned prior art, it is seen that the abrasive sleeves are fixed to the wire rope through an elastic material. However, because the intervening elastic material is foreign to the wire rope and also to the abrasive sleeves, the bond strength is not so high. Therefore, there possibly is encountered a problem that peeling takes place between the elastic material and the abrasive sleeves and between the elastic material and the wire rope.

SUMMARY OF THE INVENTION

Accordingly, an object of the invention is to provide a wire saw wherein the bond strength between the elastic material and the abrasive sleeves and between the elastic material and the wire rope is increased.

A wire saw according to the invention comprises a plurality of abrasive sleeves surrounding a wire rope and distributed at predetermined intervals longitudinally of the wire rope. Each of these abrasive sleeves has abrasive particles exposed on its outer peripheral surface. An elastic material is formed between the abrasive sleeves. This elastic material is rubber, such as natural rubber, synthetic rubber, or a mixture thereof; particularly, rubber composed mainly of natural rubber is preferably used. In such construction, a rubber/metal bonding agent is used to effect vulcanization-bonding between the opposed ends of each abrasive sleeve and the elastic material and between the wire rope and the elastic material.

According to this invention, the reliability of the bond of the abrasive sleeves and of the wire rope to the elastic material is increased by the action of the rubber/metal bonding agent. As a result, the fixing of the abrasive sleeves to the wire rope through the elastic material is attained more reliably. Therefore, movement or rotation of the abrasive sleeves on the wire rope is inhibited, and hence the wire rope is reliably protected against damage due to such movement or rotation of the abrasive sleeves. Further, when the wire saw is used, water is used to remove the heat generated at the cutting position and to remove cuttings; such water can cause the wire rope to rust. However, according to this invention, the abrasive sleeves and elastic material which are bonded together by a bonding gent prevent water from entering the wire rope, so that the wire rope rusts less frequently. Therefore, the life of the wire saw can be prolonged.

In a preferred embodiment, a chlorinated rubber type bonding agent is used as the bonding agent.

According to another aspect of the invention, there is provided a preferable construction for end connecting means for closing the wire rope in loop form.

The foregoing and other objects, features, aspects and advantages of the present invention will become more apparent from the following detailed description of the present invention when taken in conjunction with the accompanying drawings.

Figures 1, 2:
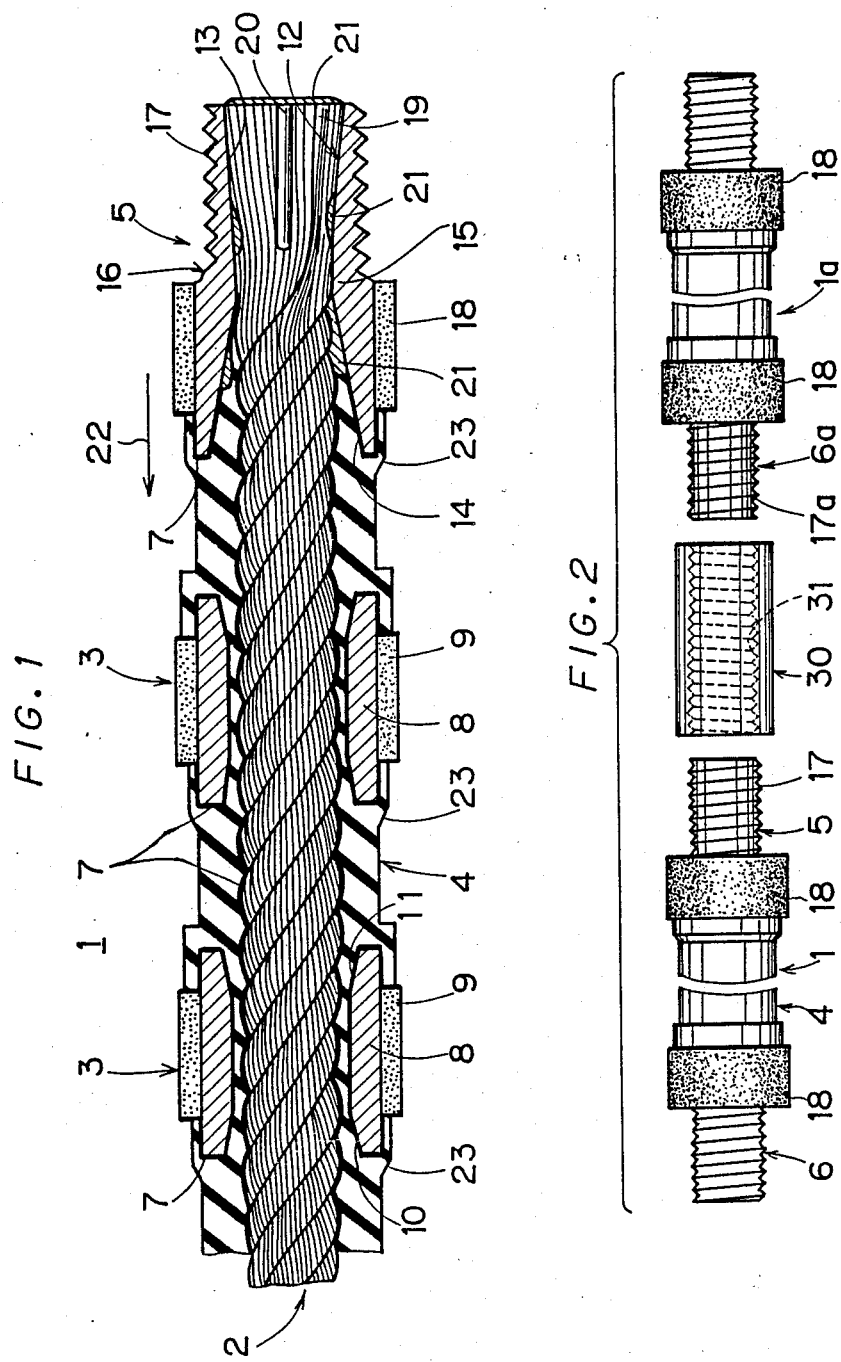
FIG. 1 is a longitudinal sectional view showing a portion of a wire rope according to an embodiment of this invention.
FIG. 2 is a front view, with individual parts shown exploded, for explaining a construction for connecting the end of the wire saw to the end of another wire saw.

DESCRIPTION OF THE PREFERRED EMBODIMENTS;

Referring to FIG. 1, a portion of a wire saw 1 adjacent one end thereof is shown. The wire saw 1 comprises a wire rope 2, a plurality of abrasive sleeves 3 and an elastic material 4 made of rubber. A threaded end connecting member 5 is fixed on one end of the wire rope 2. Fixed on the other end of the wire rope 2, as shown in FIG. 2, is an end connecting member 6 having substantially the same construction as the end connecting member 5. As shown in thick lines in FIG. 1, a rubber/metal bonding agent 7 is applied to the interface between the elastic material 4 of rubber and other elements contacted thereby, i.e., the surface of the wire rope 2, the opposite end surfaces and inner surface of each abrasive sleeve 3, and respective portions of the connecting members 5 and 6, whereby vulcanization bonding is effected between the elastic material 4 and the metal portions contacted thereby.

Stainless steel, carbon steel or the like are used for the wire rope 2. Particularly, to increase the bond strength between the wire rope 2 and the elastic material 4, the wire rope 2 is preferably formed of a steel cord in the form of steel wires having plated on the surfaces thereof at lest one of the metals, such as copper, zinc and tin (including these individual metals and alloys of combinations of these metals). Further, if the wire rope 2 to be used is formed of a cord used as a tire steel cord obtained by processing said plated steel wires at high temperature to diffuse the plating metal into the steel wires and then drawing said steel wires, then this is more preferable from said standpoint of increasing the bond strength.

Each of the abrasive sleeves 3 comprises a substantially cylindrical mount 8, and an abrasive layer 9 formed on the outer peripheral surface of said mount 8. The mount 8 is made, for example, of stainless steel and has copper plating applied to at least the outer peripheral surface thereof. The abrasive layer 9 is formed by dispersing abrasive particles, such as diamond or carborundum particles, in a metal matrix. The particle size, type and degree of concentration are suitably selected depending on the conditions of use. The abrasive layer 9 is fixed in position, for example, by a sintering operation in which copper and cobalt powders having said abrasive particles mixed therein are sintered on said mount 8. Alternatively, the abrasive layer 9 may be formed by fixing abrasive particles on the mount 8 by electroplating.

In addition, to facilitate the insertion of the wire rope 2 and to facilitate the entry of the elastic material 4, it is preferable to form tapers 10 and 11 on the opposite ends of the inner peripheral surface of the mount 8. Further, the abrasive layer 9 is preferably so formed as not to cover the axially opposite ends of the mount 8.

The end connecting member 5 is made, for example, of stainless steel and is in the form of a cylinder having an inner surface 12 defining a through-hole. The inner peripheral surface 12 is formed with a taper 13 which diverges toward one axial end of the connecting member 5. In addition, for substantially the same reason as the tapers 10 and 11 formed on said mount 8, the inner peripheral surface 12 is preferably formed with another taper 14 which diverges toward the other axial end. The formation of such tapers 13 and 14 results in the formation of a narrow region 15 in the axially intermediate portion of the inner peripheral surface 12. The end of the outer peripheral surface 16 of the connecting member 5 on the side formed with the taper 13 is formed with a male thread 17. The end of the outer peripheral surface 16 on the side formed with the taper 14 may be formed with an abrasive layer 18 of the same construction as said abrasive layer 9. This abrasive layer 18 is fixed on the connecting member 5 as by brazing.

One end 19 of the wire rope 2 is fixed to the connecting member 5 in the following manner: First, the twist in one end 19 of the wire rope 2 is undone. Then, this one end 19 of the wire rope 2 is forced into the through-hole defined by the inner surface 12 from the end on the side formed with the taper 14, until it passes through the narrow portion 15 and reaches the portion surrounded by the taper 13. Subsequently, a pin 20 is driven into the end 19 of the wire rope 2. Then, a solder 21 in molten condition is applied to the end 19 so that it permeates therethrough. The solder 21 solidifies as it fills the interstices between the strands forming the wire rope 2 and the space between the inner peripheral surface 12 and the wire rope 2.

In this manner, the connecting member 5 is fixed to the end 19 of the wire rope 2 never to slip off, under a wedge action produced between the end 19 made rigid by the solder 21 and the taper 13.

The rubber/metal bonding agent 7 is a bonding agent by which rubber and metal are vulcanization-bonded. Among such bonding agents are chlorinated rubber type bonding agents composed mainly of chlorinated rubber, and hydrochlorinated rubber type bonding agents composed mainly of hydrochlorinated rubber; particularly, the former are satisfactorily used.

Chlorinated rubber type bonding agents are produced by dissolving chlorinated rubber along with an auxiliary, such as polychloroprene, nitrile rubber or polyisocyanate, in toluene or other solvent; a typical example of such chlorinated rubber type bonding agent is "Chemlok 220" (trade name; manufactured by Lord Corporation, Elastomer Products Division). In using this "Chemlok 220", the bond strength can be increased by using a paste, as a primer, which is made mainly of a phenol resin. Such paste made mainly of a phenol resin is prepared by solving a thermosetting phenol resin alone or a phenol resin plus a small amount of polyacetal or other modified resin in a solvent such as methyl ethyl ketone; a typical example of such paste is "Chemlok 205" (trade name; manufactured by Lord Corporation).

The elastic material 4 of rubber is formed by molding using a mold in such a manner as to surround the wire rope 2. More particularly, the wire rope 2, abrasive sleeves 3 and connecting members 5 and 6, after having said rubber/metal bonding agent 7 applied to their respective predetermined regions, are inserted into the mold in such a manner as to assume the disposition shown in FIG. 1. Then, rubber which is to form the elastic material 4 is pressed, in unvulcanized condition, into the mold to fill the cavity defined in the mold. The rubber so pressed in is filled so far as to reach into the clearances between the abrasive sleeves 3 and the wire rope 2.

Subsequently, vulcanization is effected with a pressure of predetermined value or above maintained on the rubber in the mold. This vulcanization of rubber is effected preferably by adding 1–2 parts by weight of the cobalt salt of an organic acid, such as cobalt stearate, which exhibits adhesion improvement effect to the steel cord forming the wire rope 2, to 100 parts by weight of rubber.

A concrete composition of rubber material prior to vulcanization used for forming the elastic material 4 is shown below. The parts are given on a weight basis.

| Natural rubber | 100 parts |
| Carbon black | 70 parts |
| Cobalt stearate | 2 parts |
| Zinc oxide | 5 parts |
| Sulfur | 1.5 parts |
| Vulcanizing accelerator | 2.5 parts |

As for the vulcanizing accelerator, usually, guanidine type, thiazole type and thiuram type accelerators are satisfactorily used. The vulcanization is performed under the following conditions: at a temperature of 150° C. for a period of 10 minutes. At this time, the vulcanization bonding due to the bonding agent 7 is also attained.

In the concrete composition of the rubber material described above, natural rubber has been used; it has been found that such natural rubber is more resistant to repeated flexing deformation than synthetic rubber.

It should be noted that the elastic material 4 thus formed covers portions of each mount 8 and a portion of each of the connecting members 5 and 6, as shown in FIG. 1. Thereby, the strength with which the elastic material 4 holds the abrasive sleeves 3 can be increased. During cutting operation, the wire saw 1 is moved, or rotated, in the direction of arrow 22 shown in FIG. 1. The elastic material 4 riding on respective portions of the mounts 8 and connecting member 5 is preferably formed with chamfered portions 23 in order to make smoother the rotation in the direction of arrow 22 and to prevent damage to the surface of the elastic material 4. On the other hand, the portions of the elastic material 4 located on the rear side as viewed in the rotative direction 22 which ride on respective portions of the mounts 8 and connecting member 6 (FIG. 2) are made as thick as possible so long as the abrasive layers 9 can be maintained projecting beyond the surface of the elastic material 4.

In addition, the elastic material 4 may be formed without resorting to molding by pressing into a mold as described above; instead it may be formed by arranging separately prepared rubber sleeve-like members on the wire rope 2 alternately with the abrasive sleeves 3, and vulcanizing said rubber sleeve-like members while pressing the latter.

Figure 4:
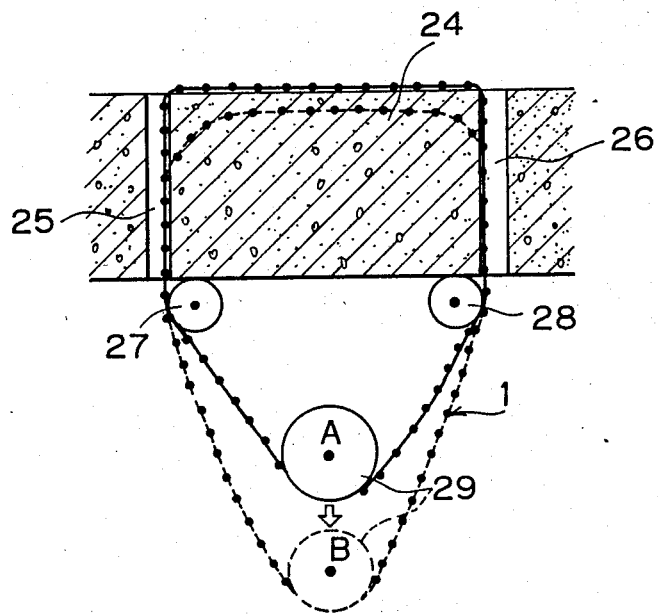
FIG. 4 is a diagrammatic view for explaining a method of cutting concrete by a wire saw.

As shown in FIG. 4, when it is desired to cut a concrete wall 24, first, through-holes 25 and 26 are formed in the wall 24 by a core drill or the like. Subsequently, the wire saw 1 is passed through these through-holes 25 and 26 and entrained around guide rollers 27 and 28. Then, the wire saw 1 is entrained around a drive pulley 29 while it is made endless to form a loop.

Figure 3:
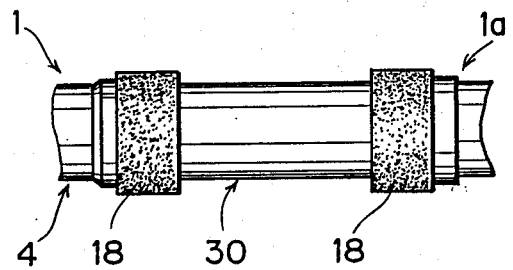
FIG. 3 is a front view showing two ends connected together by the construction shown in FIG. 2.

To make the wire saw endless, a threaded connecting sleeve 30 shown in FIGS. 2 and 3 is used. The connecting sleeve 30 is formed with a female thread 31 for engagement with said male thread 17. The male thread 17 formed on one end of the wire saw 1 is screwed into the connecting sleeve 30 from one end of the latter, while screwed thereinto from the other end is a male thread 17a formed on a connecting member 6a for another wire saw 1a. The condition after such treaded connection has been made is shown in FIG. 3.

In addition, in FIGS. 2 and 3, two or more wire saws 1 and 1a have been connected together to form a single loop; however, only one wire saw, e.g., the wire saw 1 alone, may be made endless to form a loop. In this case, in FIG. 2, the portion shown as the connecting member 6a for the wire saw 1a corresponds to the connecting member 6 for the wire saw 1.

The most suitable length of wire saw is selected depending upon the situation of a cutting work site, and it is more general to form a loop by using a single wire saw for cutting operation. However, when a loop is formed by using a single wire saw, there can be case where the wire saw has to be replaced by a shorter one as the cutting operation proceeds. In such case, if a single loop has been formed of a plurality of wire saws rather than preparing a plurality of wire saws of different lengths, it is possible, as the cutting operation proceeds, to decrease the length of the loop by decreasing the number of wire saws forming the loop.

Referring to FIG. 4, as the cutting operation by the wire saw 1 proceeds, the drive pulley 29 is moved from a position A to another position B by hydraulic pressure, for example. The length by which the drive pulley 29 can be moved is about 1 m; the situations of cutting work sites often do not make it possible to accommodate lengths beyond this limit. Under these circumstances, the connecting construction using said connecting sleeve 30 and end connecting members 5 and 6a is advantageous in that it makes it possible to decrease the number of wire saws with ease.

Figure 5:
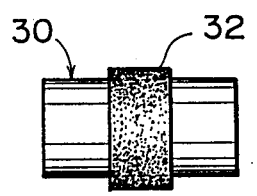
FIG. 5 and 6 are front views showing other examples of connecting sleeves which may be used in place of the connecting sleeve shown in FIG. 2.
Figure 6:
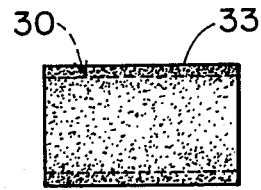

In addition, to prevent wear of the connecting sleeve 30, it is preferable to form a hard layer on the outer peripheral surface of the connecting sleeve 30. An example of such hard layer is a hard chromium plating layer. Further, as shown in FIGS. 5 and 6, a diamond particle layer 32 or 33 serving as a hard layer may be formed on a portion or the whole of the outer peripheral surface of the connecting sleeve 30.

Besides using a combination of the connecting sleeve and two end connecting members as end connecting means for forming one or more wire ropes into a single closed loop, it is possible to use a copper sleeve, in which case two ends of a wire rope or ropes to be connected together are inserted into said copper sleeve from the opposite ends of the latter, whereupon said copper sleeve is crimped. The ends of a wire rope or ropes to be connected together can also be connected by intertwining or interlacing.

Figure 7:
FIG. 7 is a diagrammatic view for explaining another example of a method of connecting the two ends of a wire rope to be connected.
Figure 8:
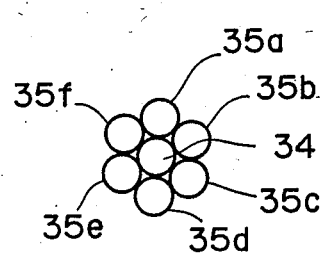
FIG. 8 is an end view of a wire rope, the view being auxiliarily referred to when the connecting method shown in FIG. 7 is explained.

When intertwining or interlacing is to be performed, in order to prevent the diameter of the connecting portion from increasing, it is preferable that, as shown in FIGS. 7 and 8, a core 34 and strands 35a, 35b, 35c, 35d, 35e and 35f, which form a wire rope be in end-to-end relation to the other respective mates. That is, first, the core 34 is butted to the other mate and then the butting of the six strands 35a–35f is effected preferably distributively with a pitch of, e.g., 40 mm. In this case, the butting of the strands 35a, 35c and 35e is effected at positions spaced farther from the butting position of the cores 34, while the butting of the other strands 35b, 35d and 35f is effected at positions spaced nearer to said butting position of the cores 34. This arrangement is preferable in that it makes it possible to increase the friction, which resists breakage, acting between the core 34 and the strands 35a–35f.

Although the present invention has been described and illustrated in detail, it is clearly understood that the same is by way of illustration and example only and is not to be taken by way of limitation, the scope of the present invention being limited only by the terms of the appended claims.

What is claimed is:

1. A wire saw comprising:
   a wire rope;
   a plurality of abrasive sleeves, each having opposite end surfaces and an outer peripheral surface and an inner peripheral surface, said outer peripheral surface having abrasive particles exposed thereon, said abrasive sleeves surrounding said wire rope and spaced at predetermined intervals longitudinally of said wire rope;
   an elastic material of rubber surrounding said wire rope between said abrasive sleeves and between said inner peripheral surface of each of said abrasive sleeves and said wire rope; and
   a rubber/metal bonding agent which effects vulcanization bonding between the opposite end surfaces of each of said abrasive sleeves and said elastic material, between said wire rope and said elastic material, between said inner peripheral surface of each of said abrasive sleeves and said elastic material, and between said wire rope and the portion of said elastic material surrounded by said inner peripheral surface.

2. A wire saw as set forth in claim 1, wherein said elastic material contains natural rubber.

3. A wire saw as set forth in claim 1, wherein said wire rope has a steel cord obtained by plating the surfaces of steel wires with at least one of the metals selected from the group consisting of copper, zinc and tin, treating said plating metal at high temperature so that said plating metal is diffused in said steel wires, and drawing said steel wires.

4. A wire saw as set forth in claim 1, wherein said bonding agent comprises a chlorinated rubber type bonding agent.

5. A wire saw as set forth in claim 1, further comprising end connecting means for forming said wire saw in a closed loop.

6. A wire saw as set forth in claim 5, wherein said end connecting means comprises:
threaded end connecting members fixed to the opposite ends of said wire rope; and
a threaded connecting sleeve for connecting two of said threaded end connecting members.

7. A wire saw as set forth in claim 6, wherein each of said threaded end connecting members is in the form of a cylinder having an outer peripheral surface and an inner peripheral surface defining a through-hole, said inner peripheral surface being formed with a taper diverging toward one axial end of said threaded end connecting member, said outer peripheral surface being formed with a male thread, one end of said wire rope being inserted into said through-hole in the diverging direction of said taper, wherein one end of said wire rope is untwisted, said wire saw further comprising:
a pin driven into said untwisted end of said wire rope; and
solder applied to said untwisted end of said wire rope, wherein said threaded connecting sleeve is formed with a female thread for engagement with said male thread of said threaded end connecting member.

8. A wire saw as set forth in claim 6, wherein at least a portion of the outer peripheral surface of said threaded connecting sleeve is formed with a hard layer.

9. A wire saw as set forth in claim 5, wherein said end connecting means comprises means for connecting the end of said wire rope by intertwining or interlacing said wire rope.

10. A wire saw as set forth in claim 1, wherein each of said abrasive sleeves has tapered portions on opposite ends of the inner peripheral surface thereof.

11. A wire saw comprising:
a wire rope;
a plurality of abrasive sleeves, each having opposite end surfaces and an outer peripheral surface and an inner peripheral surface, said outer peripheral surface having abrasive particles exposed thereon, said abrasive sleeves surrounding said wire rope and spaced at predetermined intervals longitudinally of said wire rope;
an elastic material of rubber surrounding said wire rope between said abrasive sleeves;
a rubber/metal bonding agent which effects vulcanization bonding between the opposite end surfaces of each of said abrasive sleeves and said elastic material, and between said wire rope and said elastic material; and
end connecting means for forming said wire saw in a closed loop, said end connecting means including:
threaded end connecting members fixed to the opposite ends of said wire rope, each of said threaded end connecting members being formed with a male thread; and
a threaded connecting sleeve for connecting two of said threaded end connecting members, said threaded connecting sleeve being formed with a female thread for engagement with said male thread of two of said threaded end connecting members, said female thread being a single-directional thread.

12. A wire saw comprising:
a wire rope;
a plurality of abrasive sleeves surrounding said wire rope at predetermined intervals along said wire rope;
an elastic material surrounding said wire rope substantially along the length of said wire rope, said elastic material being between said wire rope and said abrasive sleeves; and
a bonding agent on said wire rope and said abrasive sleeves, said bonding agent effecting vulcanization bonding between said abrasive sleeves and said elastic material, and between said wire rope and said elastic material.

* * * * *